[11] 3,554,186

| [72] | Inventors | Lars Leksell<br>Stockholm;<br>Lars-Gunnar Kjellberg, Sollentuna; Sven Olofsson, Skalby, Sweden |
|---|---|---|
| [21] | Appl. No. | 715,428 |
| [22] | Filed | Mar. 22, 1968 |
| [45] | Patented | Jan. 12, 1971 |
| [73] | Assignee | LKB Medical AB<br>Bromma-Stockholm, Sweden |
| [32] | Priority | Apr. 5, 1967 |
| [33] | | Sweden |
| [31] | | No. 4776/67 |

[54] APPARATUS FOR ULTRASONIC ECHO-ENCEPHALOGRAPHY
4 Claims, 3 Drawing Figs.

[52] U.S. Cl.......................................... 128/2,
73/67.9
[51] Int. Cl............................................ A61b 5/00
[50] Field of Search............................ 128/2, 2.1,
24.05(digest), 2.05M; 73/67.5, 67.7, 67.8, 67.9

[56] References Cited
Robinson et al. "Ultrasonics." Apr.-Jun. 1965, pp. 69–74 (73-67.9)

*Primary Examiner*—William E. Kamm
*Attorney*—Zabel, Baker, York, Jones and Dithmar ABSTRACT: An apparatus for ultrasonic echo encephalography comprising two separate ultrasonic transducers for emitting and receiving ultrasonic pulses, which are adapted to be positioned at the temples on opposite sides of the skull of a patient to be examined and which are connected to a transmitter-receiver assembly. The transmitter-receiver assembly is controlled by a timing device having a constant operating frequency in such way that the apparatus is automatically repeating, at a rate determined by the timing device, a sequence of four different measurements, viz echo measurement from the left side of the skull; echo measurement from the right side of the skull; through measurement from the left side to the right side of the skull; and through measurement from the right side to the left side of the skull. The echo pulses received by the two transducers during the echo measurements are supplied with opposite polarities to the Y-deflection means of a cathode ray tube. The X-deflection means of the cathode ray tube are supplied with a sweep voltage, which starts at the beginning of each measurement period as determined by the timing device and varies linearly between two constant voltage levels alternately in the positive-going and the negative-going sense. The ultrasonic pulses recieved by the transducers during the through measurements are used for automatically adjusting the rate of change of the sweep voltage to such a value that the length of each sweep equals the time of travel for an ultrasonic pulse from the one side of the skull to the opposite side and back again.

Fig 1

APPARATUS FOR ULTRASONIC ECHO-ENCEPHALOGRAPHY

FIELD OF THE INVENTION

The present invention relates to an apparatus for ultrasonic echo encephalography.

DESCRIPTION OF THE PRIOR ART

It is known in the art that it is possible to discover blood cysts and tumors in the brain of a patient and to a certain extent also to determine the position and size of the cyst or tumor by emitting by means of an ultrasonic transducer ultrasonic pulses into the brain from a position at the temple at the one side of the skull, receiving by means of the same ultrasonic transducer or a second transducer disposed close to the transmitting transducer the ultrasonic echo pulses reflected from the interior of the brain and displaying these echos on an A-scope display. This type of examination is based on the fact that there exists a structure within the brain which causes an ultrasonic echo and which is normally located in the center of the skull between the temples, but which in case of a cyst or a tumor in the brain is displaced from the center of the skull away from the side of the skull where the cyst or tumor respectively is located. The magnitude of this displacement is to a certain extent dependent upon the size of the cyst or tumor respectively. This type of examination is extremely valuable in particular on patients from accidents, who may be expected to have blood cysts in the brain.

The apparatuses hitherto available for this type of examinations are, however, very clumsy and time consuming to use. This is fundamentally due to the fact that the echo from the central structure in the brain is in most cases difficult to detect and separate from other echos received from the interior of the brain and displayed on the oscilloscopic display. Therefore, the previous examination method has been to position an ultrasonic transducer operating both as transmitter and as receiver firstly at the one temple and to display the echos received from the interior of the brain on an A-scope display and take a photograph of the picture obtained on the display screen, whereafter the transducer is repositioned to the opposite temples and the above-described steps repeated. Thereafter, one has tried to find the echo from the central structure in the brain on the two photographs obtained from the examinations, which echo should have substantially the same shape and size on both photographs. That the correct echo is selected can be checked against the fact that the sum of the distances of the selected echo from the starting point of the sweep on the two photographs shall correspond to the diameter of the skull from one temple to the opposite temple. In order to determine the diameter of the skull one has carried out a third measurement by positioning the transmitting ultrasonic transducer at the one temple and a second, receiving ultrasonic transducer at the opposite temple and displaying the ultrasonic pulses emitted by the transmitting transducer and received by the receiving transducer on the A-scope display and taking a photograph of the image on the screen. On this third photograph the registration of the ultrasonic pulse received by the receiving transducer and emitted from the opposite side of the skull will lie at a distance from the starting point of the sweep corresponding to the diameter of the skull. When using this measuring method any difference between the distances on the first two photographs between the starting point of the sweep and the echo from the central structure of the brain will obviously represent two times the displacement of the center of the skull. This previously used apparatus for ultrasonic echo encephalography is obviously very time consuming to use, as three separate measurements must be carried out with photographs being taken of the display screen of the A-scope at each measurement and the ultrasonic transducers being repositioned between the separate measurements. Furthermore, the three photographs must be compared and measured.

SUMMARY OF THE INVENTION

The principle object of the present invention is therefore to provide an apparatus for ultrasonic echo encephalography, which makes a very rapid and accurate examination of the patient possible.

Characteristic for the apparatus according to the invention is that it comprises two separate ultrasonic transducer means for emitting and receiving ultrasonic pulses, a transmitter-receiver assembly connected to said two transducer means and controlled by a timing device operating with a constant frequency in such a manner that the two transducer means emit alternately an ultrasonic pulse at the beginning of each timing period of the timing device and that during a sequence consisting of four subsequent timing periods each transducer means is operating as a receiver during one period, at the beginning of which the same transducer means has emitted an ultrasonic pulse, and also during one period, at the beginning of which the other transducer means has emitted an ultrasonic pulse. Furthermore, the apparatus comprises a cathode ray tube having X-deflection means and an Y-deflection means. The X-deflection means are connected to a sweep voltage generator which is controlled by the timing device and generates a sweep voltage which starts at the beginning of each period and varies linearly between two constant voltage levels alternately in the positive-going and the negative-going sense. The Y-deflection means of the cathode ray tube are connected to the transmitter-receiver assembly through switching means controlled by the timing device so that the echo signals received by the two transducer means are supplied to the Y-deflection means with opposite polarities.

When an apparatus according to the invention is used, the two ultrasonic transducer means are positioned at the temples on opposite sides of the skull, and the apparatus will then automatically with a very high rate determined by the frequency of the timing device repeatedly carry out a sequence of four different measurements, viz. an echo measurement from the left side of the skull; an echo measurement from the right side of the skull; a through measurement from the left side to the right side of the skull; and a through measurement from the right side to the left side of the skull. If the timing device is operating with a frequency of for instance 1,000 periods per second, 250 complete measurement sequences of this type will be carried out per second. Due to the persistence of the display screen of the cathode ray tube the results of all these measurements can be observed simultaneously on the screen of the tube. As the sweep voltage is alternately positive going and negative going during subsequent timing periods so that it is always positive going during a period when one of the transducer means has been operated as emitter and negative going during a period when the other transducer means has been operated as emitter, and as the signals received by the two transducer means are connected with opposite polarities to the Y-deflection means of the cathode ray tube, two separate images of the echo producing structures within the brain are produced on the display screen of the cathode ray tube; these images being positioned one above the other and mutually symmetrically reversed with respect to the X-axis of the display screen. In these images on the display screen of the cathode ray tube it will be very easy for an operator to detect the two mutually reversed echoes located one above the other which are derived from the central structure in the brain. The distance between these echoes and the halfway point on the sweep on the screen will correspond to any displacement of the central structure in the brain from the center of the skull.

If, however, the two mutually reversed echo images on the display screen of the cathode ray tube derived from the central structure are to be located straight above each other and the halfway point on the sweep is to represent the location of the center of the skull, it is required that the length of the sweep corresponds exactly to the propagation time for an ultrasonic pulse from the one side of the skull to the opposite side of the skull and back again. In other words, during each sweep, the sweep voltage must change its value from its one starting value to the halfway value between its two constant starting values during the time of travel for an ultrasonic pulse from the transducer means at the one side of the skull to the opposite side of the skull. In order to adjust automatically the rate of change of the sweep voltage to its correct value and thus the total time of sweep into agreement with the travel time for an ultrasonic pulse to and fro through the skull, the apparatus according to the invention is preferably provided with means which are operative during the so-called through-measurement periods, that is the periods during which one of the transducer means is operating as transmitter and the other transducer means is operating as receiver, and which determine during each such period the difference in time that may exist between the instant when the receiving transducer means receives the ultrasonic pulse emitted the transmitting transducer means, the so-called through-measurement pulse, and the instant when the sweep voltage passes the halfway value between its two constant starting values, and which produce a signal corresponding to this time difference. This signal is supplied as a correction signal to the sweep voltage generator for influencing the sweep rate circuits in the sweep voltage generator in such a way that said time difference is reduced. As in this way the sweep rate of the positive-going sweep as well as the negative-going sweep is adjusted automatically to its correct value during every fourth period and as the sweep rate circuits of the sweep voltage generator are so designed that the sweep rate can change or vary by itself only comparatively slowly, the time of each sweep will automatically during the entire measurement process be maintained on a correct value corresponding to the breadth of the skull.

In order that the through-measurement pulses received during the through-measurements period shall not appear on the display screen of the cathode ray tube in the same form as echoes, in which case they might obscure or be mistaken for real echoes, the switching means connecting the transmitter-receiver assembly to the Y-deflection means of the cathode ray tube are preferably so designed and controlled by the timing device that the signal transfer to the Y-deflection means is interrupted during the through-measurement periods, that is the periods when the one transducer means operates as transmitter and the other transducer means operates as receiver. In this way the signal received by the two transducer means will be displayed on the screen of the cathode ray tube only during the echo-measurement periods, that is only the real echoes from the various structures within the brain will be visible on the screen of the cathode ray tube. For indication of the center of the skull on the screen of the cathode ray tube this is preferably provided with intensity control means for controlling the magnitude of the electron beam, which intensity control means are connected to a bright-up pulse generator controlled by the sweep voltage generator and the timing device so as to generate during each through-measurement period a very short bright-up pulse at the instant when the sweep voltage crosses its halfway value. In this way a bright spot is produced on the display screen of the cathode ray tube indicating the halfway point on the sweep and thus also the center of the skull, so that any displacement of the two echoes derived from the central structure in the brain can be determined relative to this bright spot.

BRIEF DESCRIPTION OF THE DRAWING

In the following the invention will be further described with reference to the accompanying drawings in which an embodiment of the invention is schematically shown by way of example.

In the drawings.

Figure 1:
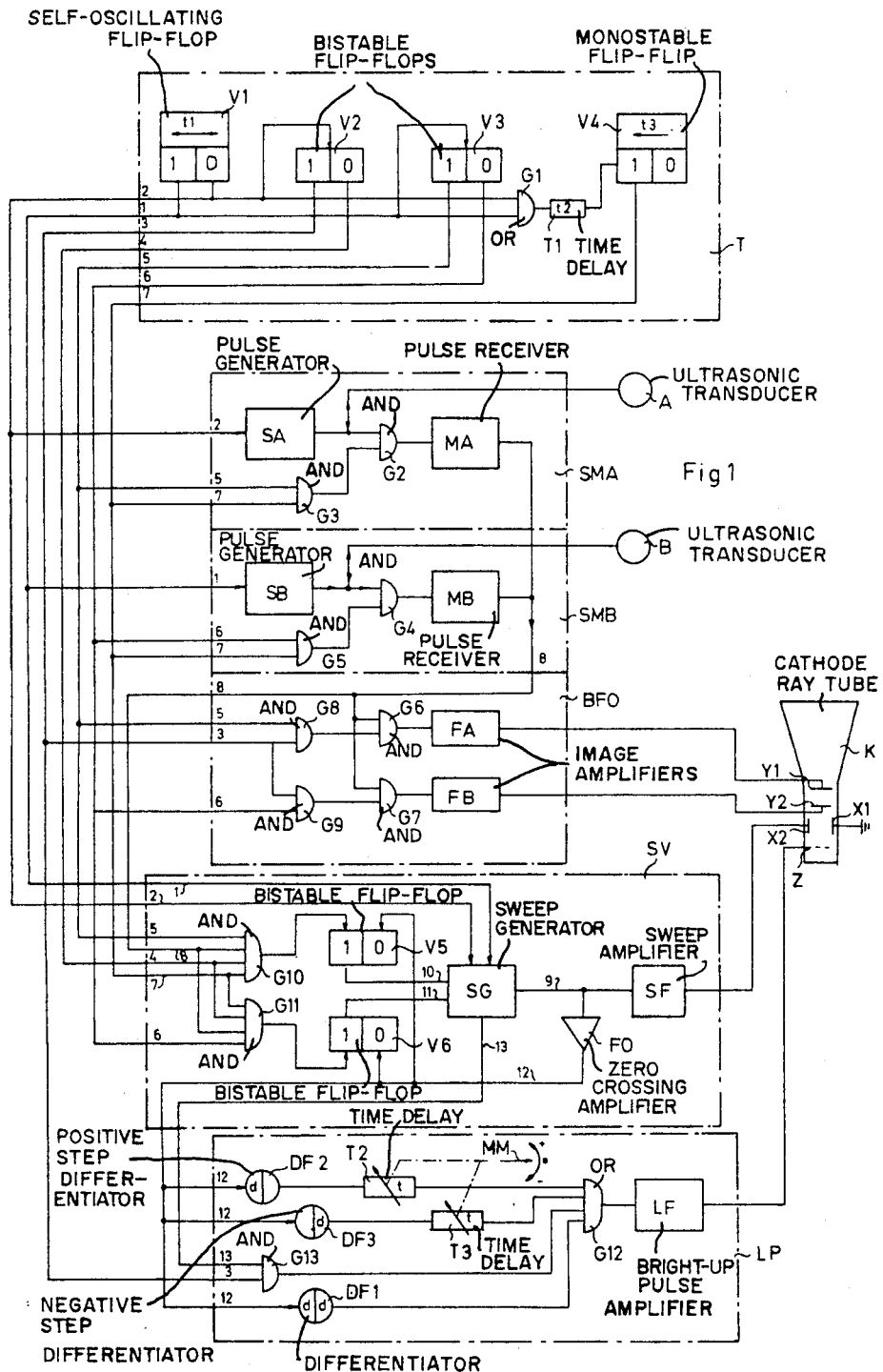
FIG. 1 is a block diagram for an apparatus according to the invention.

The apparatus according to the invention shown by way of example in the drawings comprises a timing device T, a transmitter-receiver assembly including a first transmitter-receiver unit SMA, a second transmitter-receiver unit SMB and a signal-amplifying-switching unit BFO, two ultrasonic transducers A and B, each operable as emitter as well as receiver for ultrasonic pulses, a cathode ray tube K, a sweep voltage unit SV and a brilliance control unit LP.

For all binary elements in the apparatus it is assumed that with the element in its 1-state "signal." for instance positive potential, is present on the 1-output of the element and "no signal." for instance earth potential, is present on the 0-output of the element, whereas with the element in its 0-state, "-signal" is present on the 0-output of the element and "no signal" on the 1-output of the element.

The timing device T includes four binary elements V1, V2, V3 and V4. The binary element V1 is self-oscillating and oscillates automatically between its 1-state and its 0-state and remains in each state during a predetermined period of time $t_1$. The 1-output of the element V1 is connected to a conductor 1, whereas the 0-output of the element is connected to a conductor 2. The binary elements V2 and V3 are bistable. The element V2 is controlled from the 0-output of the element V1. Consequently, the binary element V2 changes state each time the element V1 assumes its 0-state, whereas the binary element V3 changes state each time the element V1 assumes its 1-position. The binary element V4 is monostable and is normally in its 0-state but can be switches to its 1-state by a signal on its trigger input and will then remain in its 1-state during a predetermined period of time $t_3$ and thereafter automatically return to its stable 0-state. The 1-output and the 0-output of the element V1 are connected to an OR-gate G1, the output of which is connected to the trigger input of the binary element V4 through a signal delaying element T1 delaying the signal by the period of time $t_2$. The 1-output and 0-output of the binary element V2 are connected to conductors 3 and 4 respectively, the 1-output and the 0-output of the element V3 to conductors 5 and 6 respectively and the 1-output of the element V4 to a conductor 7.

Figure 2:
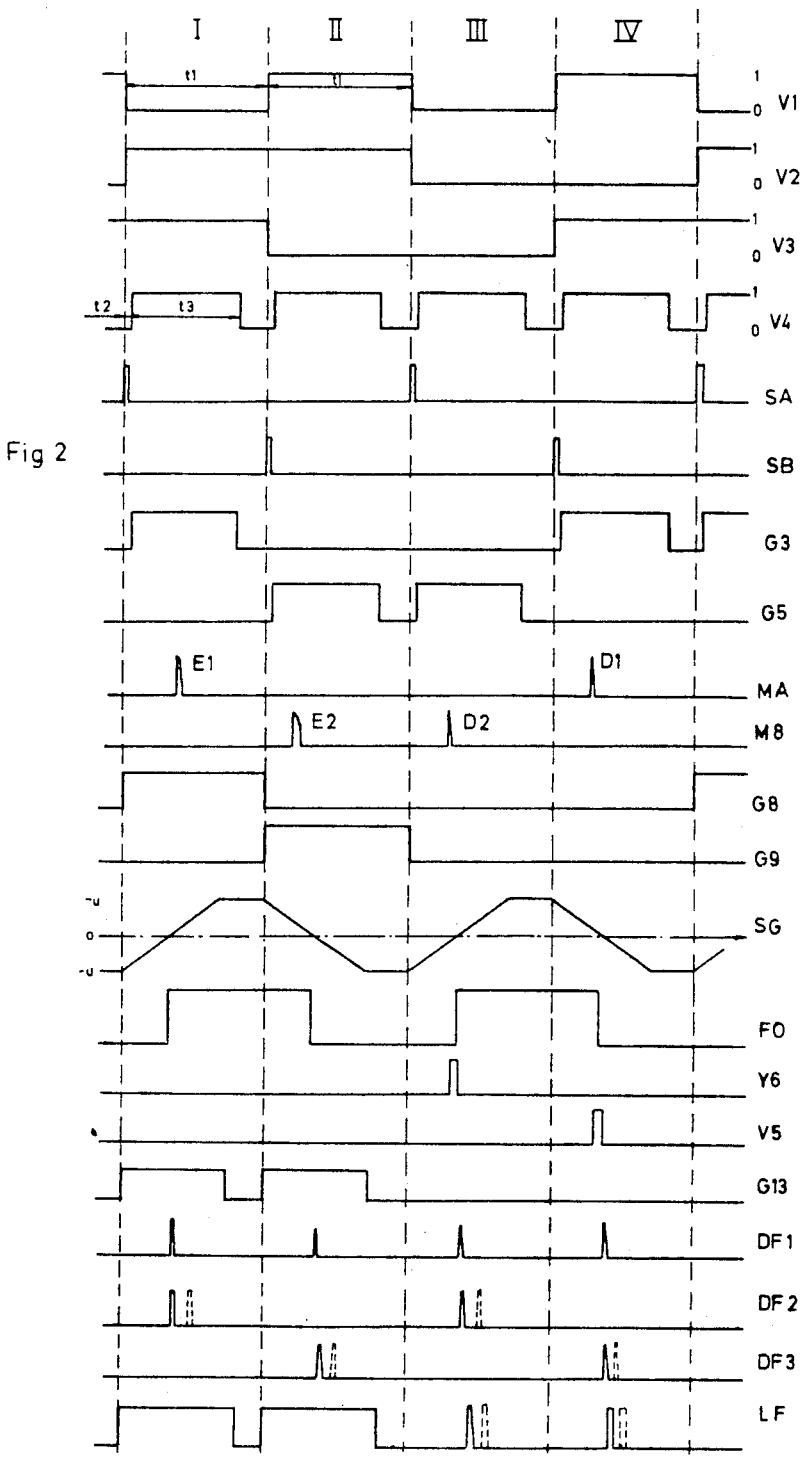
FIG. 2 illustrates schematically the states of some binary elements in this apparatus and the signal wave forms at certain points in the apparatus during four subsequent timing periods.

In FIG. 2 the wave forms for V1, V2, V3 and V4 show the state of the corresponding binary elements in the timing device T during a sequence consisting of four successive timing periods I, II, III and IV. The upper level marked with 1 indicates that the associated binary element is in its 1-state, whereas the lower level marked with 0 indicates that the binary element is in its 0-state. Consequently, the curve for V1 illustrates also the signal wave form on the conductor 1, if it is assumed that the upper level of the curve indicates "signal", whereas the lower level of the curve indicates "no signal". In the same way the curve for V2 illustrates the signal wave form on the conductor 3, the curve for V3 the signal wave form on the conductor 5, and the curve for V4 the signal wave form on the conductor 7.

Each timing period I to IV has obviously the length $t_1$. The signal pulses on the conductor 7 connected to the 1-output of the binary element V4 do not start, however, until the period of time $t_2$ after the starting point of each timing period and have only the length $t_3$. The length $t_1$ of each period can for instance be 1,000 $\mu$us, whereas $t_2$ is 20 $\mu$us and $t_3$ is 300 $\mu$us. Due to the available space and for the sake of lucidity the relative proportions between the lengths of the signal pulses in FIG. 2 are not scale. This is, however, without importance for an understanding of the fundamental operation of the apparatus.

The first transmitter-receiver unit SMA is connected to the ultrasonic transducer A and includes a pulse transmitter SA and a pulse receiver MA. The transducer A is connected to the output of the transmitter SA and also to one input of an AND-gate G2, the output of which is connected to the input of the receiver MA. Furthermore, there is an additional AND-gate G3 having two inputs connected to the conductors 5 and 7 respectively and an output connected to the second input of the gate G2. The transmitter SA is designed to produce a very short pulse of high frequency energy, for instance a pulse with the frequency 2 MHz and a length of some microseconds, when a signal is supplied to the input of the transmitter. The input of the transmitter is connected to the conductor 2, whereby the receiver will supply a short high frequency pulse to the ultrasonic transducer A at the beginning of every second period, as shown by the curve SA in FIG. 2. The ultrasonic transducer A will generate and emit a corresponding ultrasonic pulse. During the four periods shown in FIG. 2, consequently, the transducer A emits an ultrasonic pulse at the beginning of period I and period III. When signals are present on both inputs 5 and 7 of the gate G3, signal is also present on the output of the gate and this output signal opens the gate G2 and thus the input to the receiver MA for for the high frequency pulses from the transducer A corresponding to the ultrasonic pulses received by this transducer. The curve G3 in FIG. 2 represents the signal wave form on the output from the gate G3 and thus also the time intervals during which the receiver MA is open for pulses from the transducer A. It is seen that the receiver MA is open, so that the ultrasonic transducer A can operate as receiver, only during the periods I and IV. It is also seen that the receiver MA is not opened until the time $t_2$ after the beginning of the period and is kept open only during the time $t_3$, whereby the original pulse emitted at the beginning of the period is prevented from passing directly into the receiver and echo pulses reflected several times within the skull are prevented from entering the receiver MA.

The second transmitter-receiver unit SMB is connected to the second ultrasonic transducer B and is designed in exactly the same way as the first transmitter-receiver unit SMA connected to the transducer A. Consequently, this second transmitter-receiver unit SMB includes a transmitter SB, a receiver MB and two AND-gates G4 and G5. The input of the transmitter SB is connected to the conductor 1, whereby this transmitter SB will produce a short pulse of high frequency energy to the ultrasonic transducer B at the beginning of those periods when the transmitter SA and the ultrasonic transducer A do not produce any pulses. As shown by the curve SB in FIG. 2 the transmitter SB and thus the transducer B will emit a pulse at the beginning of the periods II and IV. The AND-gate G5 is controlled by the signals on the conductors 6 and 7, whereby the signal wave form on the output of this gate will be that illustrated by the curve G5 in FIG. 2. The gate G4 and thus the input to the receiver MB is consequently kept open for pulses from the ultrasonic transducer B during the periods II and III.

As can be seen from the curves SA, SB, G3 and G5 in FIG. 2, during the period I the transducer A will operate both as transmitter and as receiver, during the period II the transducer B will operate both as transmitter and as receiver, during the period III the transducer A will operate as transmitter and the transducer B as receiver, and during the period IV the transducer B will operate as transmitter and the transducer A as receiver. As the ultrasonic transducers A and B, when the apparatus is used for an examination, are positioned at each temple on opposite sides of the skull of the patient, the transducer A will during the period I receive echoes of the ultrasonic pulse emitted by itself and reflected from the structures within the brain and during the period IV receive the ultrasonic pulse emitted by the other transducer B after the passage of this pulse through the skull. In a similar way, the transducer B will during the period II receive echoes of the ultrasonic pulse emitted by itself and during the period III receive the ultrasonic pulse emitted by the other transducer A after the passage of this pulse through the skull. The periods I and II are herein called echo-measurement periods, whereas the periods III and IV are called through-measurement periods.

As illustrated by the curve MA in FIG. 2 one obtains consequently from the receiver MA during the period I a number of echo pulses, however only one echo pulse E1 corresponding to the echo from the central structure in the brain being shown in the drawing, and during the period IV a single through-measurement pulse D1. In the same way one obtains from the receiver MB, as illustrated by the curve MB in FIG. 2, during the period II an echo pulse E2 from the central structure in the brain and during the period III a through-measurement pulse D2. If the central structure in the brain is displaced from the center of the skull, the time interval from the beginning of the period I to the occurrence of the echo E1 will obvious differ from the corresponding time interval from the beginning of the period II to the occurrence of the echo E2. This is indicated in FIG. 2, in which it is assumed that the central structure in the brain is displaced from the center of the skull so as to be located at a larger distance from the side of the skull where the transducer A is positioned than from the opposite side of the skull where the transducer B is positioned. The interval of time from the beginning of period III to the occurrence of the through-measurement pulse D2, on the contrary, is of course identical to the time interval from the beginning of the period IV to the occurrence of the through-measurement pulse D1, as both these time intervals correspond to the time of travel for an ultrasonic pulse from the one side of the skull to the opposite side.

The outputs of the two receivers MA and MB are connected to a common conductor 8, on which all echo pulses and through-measurement pulses will appear. The conductor 8 is connected on the one hand to the image-amplifying switching unit BFO and on the other hand to the sweep unit SV. The image-amplifying switching unit BFO includes two image amplifiers FA and FB having their inputs connected to the outputs of an AND-gate G6 and G7 respectively. The conductor 8 from the outputs of the receivers MA and MB is connected to one input for each one of these two gates G6 and G7. The second inputs of the gates are connected to the outputs of additional AND-gates G8 and G9 respectively. The inputs of the gate G8 are connected to the conductors 3 and 5 from the timing device T, whereas the inputs of the gate G9 are connected to the conductors 3 and 6. When signals are present on both inputs of the gate G8, there is also signal on the outputs of the gate, whereby the gate G6 is opened and the signal pulses on the conductor 8 are supplied to the image amplifier FA. In the same way, when signals are present on both inputs of the gate G9, the output signal of the gate G9 opens the gate G7 so that the signals on the conductor 8 are supplied to the second image amplifier FB. The curves G8 and G9 in FIG. 2 indicate the signal wave form on the output of the gate G8 and the gate G9 respectively. Consequently, the output signal from the gate G8 keeps the gate G6 and thus the input to the amplifier FA open only during the period I, that is the echo-measurement period for the transducer A, whereas the gate G9 keeps the gate G7 and thus the input to the second image amplifier FB open only during the period II, that is the echo-measurement period for the transducer B. During the two through-measurement periods III and IV the inputs of both image amplifiers FA and FB are blocked. During the period I the echo pulses (E1) received by the transducer A are consequently supplied to the image amplifier FA, which has its output connected to the upper Y-deflection plate Y1 in the cathode ray tube K. During the period II the echo pulses (E2) received by the transducer B are in the same way supplied to the image amplifier FB, which has its output connected to the lower Y-deflection plate Y2 in the cathode ray tube K. Consequently, the echo pulses (E1) received by the transducer A deflect the electron beam for instance in direction upwards on the display screen of the cathode ray tube K, whereas the echo pulses (E2) received by the transducer B deflect the electron beam in the opposite direction, that is downwards, on the display screen of the cathode ray tube K. The through-measurement pulses (D1, D2) received by the two transducers A and B during the through-measurement periods III and IV will not cause any deflection of the electron beam in the cathode ray tube K.

The sweep voltage for the sweep deflection of the electron beam in the cathode ray tube K in the X-direction over the display screen of the tube is generated by the sweep unit SV. This sweep unit SV includes a sweep voltage generator SG designed to generate a sweep voltage, which varies linearly between two constant starting voltage levels, for instance −U and +U, alternately in the positive-going sense and the negative-going sense. The sweep voltage generator SG is provided with two trigger inputs connected to the conductor 1 and the conductor 2 respectively from the timing device T. A signal applied to the trigger inputs connected to the conductor 2 will start a positive-going sweep, whereas a signal applied to the trigger input connected to the conductor 1 will start the negative-going sweep. The sweep voltage produced on the output 9 of the sweep generator SG has consequently the wave form illustrated by the curve SG in FIG. 2. The sweep voltage is positive-going during the periods I and III, that is when the transducer A is the transmitting transducer, and negative-going during the periods II and IV, that is when the transducer B is the transmitting transducer. The sweep voltage from the sweep voltage generators SG is connected via a sweep voltage amplifier SF to the one X-deflection plate X2 in the cathode ray tube K, whereas the second X-deflection plate X1 is connected to earth or to a suitable fixed potential. During the periods I and III, when the transducer A is operating as the transmitting transducer, the electron beam in the cathode ray tube K will consequently be deflected for instance from the left to the right across the display screen of the tube (FIG. 3) at a rate corresponding to the rate of change of the positive-going sweep voltage, whereas during the periods II and IV, when the transducer B is operating as the transmitting transducer, the electron beam is deflected in the opposite sense from the right to the left across the display screen of the tube (FIG. 3) at a rate corresponding to the rate of change of the negative-going sweep voltage. The echo pulses (E1) received by the transducer A during the echo-measurement period I will consequently deflect the electron beam upwards on the display screen of the cathode ray tube at the same time as the electron beam is continuously moved under the influence of the positive-going sweep voltage during this period from the left to the right across the display screen, whereas on the other hand the echo pulses (E2) received by the transducer B during the echo-measurement period II will deflect the electron beam downwards on the display screen of the cathode ray tube at the same time as the electron beam is continuously displaced from the right to the left across the display screen under the influence of the negative-going sweep voltage during this period. During the echo-measurement period I and other corresponding echo-measurement periods there is consequently produced on the display screen of the cathode ray tube the sweep designed SI in FIG. 3 having upwards directed echo pulses (E1), whereas during the echo-measurement period II and all other corresponding echo-measurement periods the sweep SII in FIG. 3 having downwards directed echo pulses (E2) is produced. If the two echo pulses E1 and E2 are derived from the same structure in the brain, as in the present example where it has been assumed that they are derived from the central structure in the brain, these echoes will be positioned straight above each other. In this way the echoes from the central structure in the brain are very easily detected and identified on the display screen of the cathode ray tube.

If, however, echoes received by the two transducers A and B from one and the same structure in the brain are to be positioned straight above each other on the display screen of the cathode ray tube, as described above, it is obviously necessary that the length of the sweep corresponds accurately to the breadth of the skull from the one side to the opposite side thereof, or with other words, that the sweep time corresponds exactly to the time of propagation for an ultrasonic pulse from a transducer positioned on the one side of the skull to the opposite side of the skull and back again to the same transducer. As the breadth of the skull is different for different patients, it is obviously necessary to adjust the sweep time, that is the rate of change of the sweep voltage, to a correct value for each patient and thereafter to maintain this value during the examination process.

In the apparatus according to the invention shown in the drawing this is achieved automatically by means of the remaining components in the sweep unit SV. These components are two AND-gates G10 and G11, two bistable binary elements V5 and V6 and a zero-crossing amplifier FO. Furthermore, the sweep voltage generator SG is provided with two correction or adjustment inputs 10 and 11, which are connected to the circuits in the sweep generator SG determining the rate of change of the negative-going sweep voltage and the rate of change of the positive-going sweep voltage respectively in such a way that a signal supplied to the associated correction input 10 or 11 respectively will increase the rate of change of the negative-going sweep voltage or the positive-going sweep voltage respectively by an amount corresponding to the length of the correction signal. The circuits determining the rate of change of the sweep voltage can for instance include a capacitor for the positive-going sweep and a second capacitor for the negative-going sweep, the charge of the capacitor determining the rate of change of the sweep voltage and being increased by an amount corresponding to the length of a correction signal applied to the associated correction input. The correction signal on the input 10 for the correction of the rate of change of the negative-going sweep voltage is obtained from the 1-output of the binary element V5, whereas the correction signal on the input 11 for the correction of the rate of change of the positive-going sweep voltage is obtained from the 1-output of the binary element V6. The 0-inputs of the binary elements V5 and V6 are connected to the conductor 12 from the zero-crossing amplifier FO in block SV. The trapezoidal sweep voltage on the conductor 9 from the sweep voltage generator SG is supplied to the zero-crossing amplifier FO which, as well known in the art, has such a large amplification and such an amplitude limiting that on the output conductor 12 of the amplifier FO a square wave voltage is produced, in which the vertical steps coincide with the zero crossings of the sweep voltage. The square voltage produced on the output of the zero-crossing amplifier F0, that is on the conductor 12, has consequently the wave form illustrated by the curve F0 in FIG. 2, and this voltage is connected to the 0-inputs of the binary elements V5 and V6. The binary element V6 is transferred to its 0-state, if it is not already in this state, by each positive-going step in the square wave voltage on the conductor 12 and is locked in this 0-state during the subsequent positive half period of the square wave voltage. The binary element V5 on the contrary is transferred to its 0-state, if it is not already in this state, by each negative-going step of the square wave voltage and is locked in this 0-state during the subsequent negative half period of the square wave voltage. The 1-inputs of the binary elements V5 and V6 are connected to the output of the AND-gate G10 and the AND-gate G11 respectively, whereby the binary element V5 is switched to its 1-state each time a signal occurs on the output of the gate G10, whereas the binary element V6 is switched to its 1-state each time a signal occurs on the output of the gate G11, provided however that the binary elements are not locked in their 0-states in the manner previously described.

The gate G10 has four inputs connected to the conductors 4, 5 and 7 from the timing device T and to the conductor 8 from outputs of the two receivers MA and MB, whereby the gate G10 transfers during the through-measurement period IV the through-measurement pulse D1 received during this period by the transducer A and thus the receiver MA. Consequently, this through-measurement pulse D1 switches the binary element V5 to its 1-state, unless the binary element is locked in its 0-state by a negative half period in the square wave voltage on the conductor 12. As can be seen from the curves MA, SG and FO in FIG. 2, the binary element V5 is locked in its 0-position by a negative half period in the square wave voltage on the conductor 12 from the zero-crossing amplifier FO when the through-measurement pulse D1 occurs, only in the case that during the period IV in question the negative-going sweep voltage has already passed or is just passing through zero. As already mentioned, the time interval from the beginning of the period IV to the occurrence of the through-measurement pulse D corresponds exactly to the propagation time of the ultrasonic pulse from the transducer B, that is the one side of the skull, to the transducer A, that is the opposite side of the skull, and with a correct sweep rate this time interval shall correspond exactly to the time interval from the beginning of the period to the zero crossing of the sweep voltage. If the sweep rate, that is the rate of change of the sweep voltage, is too low, the through-measurement pulse will obviously occur before the zero crossing of the sweep voltage, whereby the through-measurement pulse D1 transferred by the gate G10 will switch the binary element V5 to its 1-state. As a consequence signal is produced on the 1-output of the element V5 and supplied to the correction input 10 of the sweep generator SG for correction of the rate of change of the negative-going sweep voltage. This signal on the correction input 10 will remain until the zero crossing of the sweep voltage, when the negative half period of the square wave voltage on the conductor 12 switches the binary element V5 to its 0-state. Consequently, if the negative-going sweep is too slow, a correction signal is supplied to the correction input 10 of the sweep voltage generator and this correction signal has a length proportional to the deviation of the sweep rate from its correct value. In the example illustrated in FIG. 2 it has been assumed that the negative-going sweep during the period IV is too slow, wherefore the correction signal is produced on the 1-output of the binary element V5 and supplied to the correction input 10 of the sweep voltage generator, as illustrated by the curve V5 in FIG. 2. Under the influence of this correction signal the sweep rate of the negative-going sweep is increased in the manner previously described. Should this correction be too small, this will be discovered during the next through-measurement period IV and an additional correction will be made. Should the sweep rate be too high so that the zero crossing of the sweep voltage occurs before the through-measurement pulse D1, no correction signal is supplied to the correction input 10 of the sweep generator SG. As however the sweep rate is determined, as previously described, by the charge of a capacitor in the sweep generator, there is always a continuous decrease of the sweep rate due to the unavoidable discharge of the capacitor. As soon as the capacitor has been discharged so far that the sweep rate is lower than the correct sweep rate, correction is made as described above for increasing the sweep rate, whereby the sweep rate is maintained very close to its correct value.

The binary element V6 and the gate G11 provide a similar correction of zero-crossing rate of the positive-going sweep. For this purpose the gate G11 has four inputs connected to the conductors 4, 6 and 7 from the timing device T and to the conductor 8 from the output of the two receivers MA and MB, whereby this gate G11 transfers during the through-measurement period III the through-measurement pulse D2 received by the transducer B, whereby this pulse can switch the binary element V6 to its 1-state, unless the binary element is locked in its 0-state by a positive half period of the square wave voltage on the conductor 12 from the zero crossing amplifier FO. Also in this case it has been assumed in FIG. 2 that the positive-going sweep voltage during the period III has a somewhat too low rate of change so that its zero crossing occurs after the through-measurement pulse D2, whereby the binary element V6 is switched to its 1-state by the through-measurement pulse D2 and a correction signal is produced on the 1-output of the element V6 and supplied to the correction input 11 of the sweep generator SG. This correction signal is interrupted, when the sweep voltage crosses zero and the binary element V6 is switched to its 0-state by the positive half period of the square voltage on the conductor 12. The curve V6 in FIG. 2 shows the correction voltage supplied to the correction input 11 of the sweep generator from the 1-output of the binary element V6.

Due to the above described correction of the rates of the positive-going and the negative-going sweep respectively the zero crossing of the sweep voltage will always correspond to the propagation time for an ultrasonic pulse from the one side of the skull to the opposite side thereof, or in other words to the propagation time for the ultrasonic pulse from the one side of the skull to the center of the skull and back again to the same side of the skull. The zero crossings of the sweep voltage can consequently be used for indication of the center of the skull on the display screen of the cathode ray tube. For this purpose the cathode ray tube K is, as well known in the art, provided with a brilliance or intensity control grid Z, which is connected to a bright-up pulse amplifier LF in the brilliance control unit LP. The bright-up pulse amplifier LF produces when receiving a signal on its input such a voltage on its output, which is connected to the brilliance control grid Z, that the intensity of the electron beam in the cathode ray tube K is increased to such a value that the electron beam produces a bright spot on the display screen. If this voltage from the bright-up pulse amplifier LF is missing, the electron beam is suppressed so that it does not produce an image on the display screen of the cathode ray tube. The input of the bright-up pulse amplifier LF is connected to the output of an OR-gate G12. This OR-gate has four inputs and will consequently supply a signal to the input of the bright-up pulse amplifier LF as soon as signal is present on anyone of the four inputs of the gate.

Figure 3:
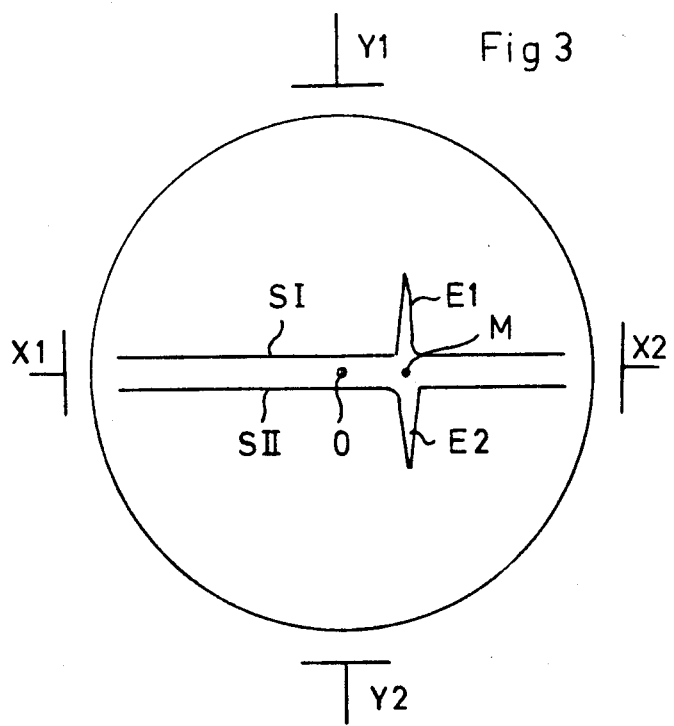
FIG. 3 shows schematically and simplified the image produced on the display screen of the cathode ray tube, when the central structure in the brain is displaced to the one side from the center of the skull.

One input of the gate G12 is connected to the output of an AND-gate G13 having one input connected to the conductor 3 from the timing device T and a second input to a conductor 13 from the sweep voltage generator SG. The sweep voltage generator SG produces on the conductor 13 is a signal during each sweep, positive going or as well as negative going. Consequently, the gate G13 supplies to the one input of the gate G12 a signal having the waveform illustrated by the curve G13 in FIG. 2. Consequently, an input signal is applied from the gate G13 through the gate G12 to the bright-up pulse amplifier LF during the time of the sweep during each one of the two echo-measurement periods I and II, whereby the bright-up pulse amplifier LF produces during these sweeps a bright-up pulse supplied to the brilliance control grid Z of the cathode ray tube. In this way the sweeps are made visible during the echo-measurement periods I and II. In FIG. 3 these sweeps are indicated with SI and SII respectively. During the through-measurement periods III and IV on the other hand no corresponding long bright-up pulses covering the whole time of the sweep are produced, and during these periods III and IV the sweep is consequently extinguished and not visible on the display screen of the cathode ray tube.

For the indication of the halfway point of the sweep and thus of the center of the skull on the screen of the cathode ray tube the square wave voltage on the conductor 12 from the zero-crossing amplifier FO is supplied to a differentiating circuit DF1 which differentiates the positive steps as well as the negative steps of the square wave voltage and rectifies the differentiated signals, whereby on the output from the circuit DF1 a series of pulses coinciding with the zero crossings of the sweep voltage is produced, as illustrated by the curve DF1 in FIG. 2. This pulse series is supplied to one input of the gate G12 and is consequently transferred by this gate to the input of the bright-up pulse amplifier LF. During the echo-measurement periods I and II these pulses will have no effect upon the bright-up pulse amplifier LF as this is already saturated by the signals from the gate G13 as previously described. During the through-measurement periods III, IV on the other hand the bright-up pulse amplifier LF produces for each one of the pulses from the differentiating circuit DF1, which pulses coincide with the zero crossings of the sweep voltage, a short bright-up pulse which for a short instant increases the brilliance of the sweep so that a brilliant spot, indicated by 0 in FIG. 3, is produced on the screen of the cathode ray tube. As mentioned above this brilliant spot 0 will indicate the halfway point on the sweep and thus also the center of the skull.

For measuring the distance between the echoes (E1, E2) and the center of the skull (O) there is also provided a brilliant marker spot M which can be moved along the X-axis on the screen of the cathode ray tube. This marker spot M is derived from the square wave voltage on the conductor 12 from the zero-crossing amplifier FO. For this purpose the square wave voltage is in the brilliance control unit LP connected to two additional differentiating circuits DF2 and DF3. The differentiating circuit DF2 differentiates only the positive going steps of the square wave voltage and produces on its output corresponding short pulses, whereas the second differentiating circuit DF3 differentiates only the negative-going steps in the square wave voltage and produces on its output corresponding short pulses. Consequently, on the output of DF2 the pulses shown by full lines in diagram DF2 in FIG. 2 are produced, whereas on the output of DF3 the pulses shown by full lines in the diagram DF3 in FIG. 2 are produced. The output of the differentiating circuit DF2 is connected to one input of the gate G12 via a delay circuit T2 having a delay time which is manually variable from zero, whereas the output of the differentiating circuit DF3 is connected to another input of the gate G12 through a second delay circuit T3 also having a delay time which can be varied manually from zero. By the delay circuit T2 it is consequently possible to delay the pulses from the differentiating circuit DF2 by a time which can be manually set, as illustrated by dotted pulses in diagram DF2 in FIG. 2. By the delay circuit T3 it is in the same way possible to delay the pulses from the different gating circuits DF3 by a time which can be manually set, as illustrated with dot pulses in the diagram DF3 in FIG. 2. The delay setting means of the delay circuits T2 and T3 are coupled to a suitable manual control member MM, for instance a knob, in such a way that with this knob in a zero position the delay time is zero in both delay circuits T2 and T3, whereas if the knob is rotated from zero position in the one direction (+) the delay time is increased continuously in the delay circuit T2 but remains zero in the other delay circuit T3, and if the knob is rotated in the opposite direction (−) from its zero position the delay time is increased continuously in the delay circuit T3 but remains zero in the delay circuit T2. If the knob MM is in its zero position and thus the delay time in both delay circuits T2 and T3 is zero, the pulses from the two differentiating circuits DF2 and DF3 will obviously coincide with the pulses from the differentiating circuit DF1 and do not cause any additional bright spot on the screen of the cathode ray tube. If, however, the knob MM is rotated in the one direction (+), the pulses from the differentiating circuit DF2 are delayed, as indicated by the dotted pulses in the diagram DF2 in FIG. 2, whereby during the through-measurement period III the bright-up pulse amplifier LF is caused to produce an additional bright-up pulse which occurs after the bright-up pulse corresponding to the zero crossing of the sweep voltage and which consequently produces a bright marker spot M on the display screen of the cathode ray tube located to the right of the bright spot 0 indicating the center sweep. The distance between the marker spot M and the half-wave point 0 of the sweep is determined by the setting of the knob MM. If the knob MM is rotated in the opposite direction (−), the pulses from the differentiating circuit DF3 are delayed in the manner indicated by the dotted pulses in the diagram DF3 in FIG. 2, so that during the through-measurement period IV the bright-up pulse amplifier LF is caused to produce an additional short bright-up pulse, which occurs after the bright-up pulse corresponding to the zero crossing of the sweep voltage and thus produces on the screen of the cathode ray tube a bright marker spot positioned to the left of the halfway point 0 of the sweep at a distance therefrom determined by the setting of the knob MM. The scale for the knob MM may preferably be graded directly in displacement from the center of the skull.

In FIG. 2 diagram LF shows the bright-up pulses produced by the bright-up pulse amplifier LF during the four periods I to IV; the dotted bright-up pulses indicating the marker pulses which can be displaced manually by means of the knob MM with respect to the zero crossing of the sweep voltage. It should be noted, however, that only one of these marker pulses can exist at any given time.

It is obvious that various modifications are possible in the apparatus according to the invention described by way of example in the foregoing and that the design details of an apparatus according to the invention can vary considerably within the scope of the invention.

We claim:

1. An apparatus for ultrasonic echo encephalography comprising:
   a first transducer (A) for emitting and receiving pulses of ultrasonic energy;
   a first ultrasonic pulse generating means (SA) and a first ultrasonic electric pulse receiving means (MA) for said first transducer;
   a first electric wave transmission channel from said first pulse generator to said first transducer to supply electric energy at a predetermined ultrasonic frequency to said first transducer for emitting ultrasonic acoustic energy for propagation through the skull when said transmission channel is operative;
   a first electric wave receiving channel from said first transducer to said first pulse receiving means for supplying said receiver with electric energy at ultrasonic frequencies corresponding to the acoustic ultrasonic energy impinging upon said first transducer when said first receiving channel is operative;
   a corresponding second transducer (B) for cooperation with said first transducer when said two transducers are positioned at the temples on opposite sides of the skull of a patient to be examined;
   corresponding second pulse generating means (SB) and second receiving means (MB) for said second transducer;
   second transmission and receiving channels interconnecting said second pulse generating means and said second receiving means;
   a cyclically operating sequence control means (T) including as a part thereof a primary timing oscillator (VI) for generating primary timing pulses functioning as one apparatus primary operating cycle divided into four equal successive time periods I, II, III, IV;
   means controlled by said sequence control means for activating the appropriate channels to operate the first transducer as an acoustic transmitter only at the beginning of periods I and III for a duration small in comparison to an entire period and to operate the second transducer similarly for periods II and IV;
   means controlled by said sequence control means for activating appropriate channels to operate the first transducer as an acoustic receiver during period I after said first transducer has ceased transmitting and during period IV after the second transducer has ceased transmitting, and to operate the second transducer as an acoustic receiver during period II after said transducer has ceased transmitting and during period III after the first transducer has ceased transmitting;
   a cathode ray tube (K) having X-(horizontal) deflecting means (X1, X2) and Y-(vertical) deflecting means (Y1, Y2);
   means for generating a linear X-sweep voltage (SG) varying between two constant positive and negative values (U) having similar absolute values;
   means controlled from said sequence control means (T) for synchronizing the sweep voltage so that at the beginning of each time period I, II, III and IV, the sweep voltage is at maximum absolute value and varies linearly during a period to the oppositely poled absolute value and reaches such value prior to the end of the timing period and remains at such value to the end of the timing period, said primary timing oscillator operating at such a repetition rate that each time period is a bit longer than the transit time for a round trip through the skull for an ultrasonic pulse;

means for applying said sweep voltages to the X-deflecting means, the change in sweep voltage polarity during periods I and III causing the sweep to go in a positive going sense between sweep limits and to reverse sweep in a negative going sense during periods II and IV;

signal channels between the Y-deflecting means on the one hand and each of the outputs of said pulse receiving means (MA and MB) on the other hand;

means controlled by said sequence control means (T) for activating the channel from the first pulse receiving means (MA) to said Y-deflecting means to provide signals of one polarity during period I and for activating the other channel from the second pulse receiving means (MB) to said Y-deflecting means to provide signals of opposite polarity during period II;

said transducers and direction X-sweep being so arranged that for example the left transducer will correspond functionally with the X-sweep beginning from the left and the right transducer will correspond functionally with the X-sweep beginning from the right; and whereby the tube display, insofar as left and right are concerned, is naturally associated with the left and right parts of the skull, the X-sweep time in either direction of sweep locating the skull center on the X-sweep at the midpoint of each sweep.

2. An apparatus for ultrasonic echo encephalography comprising:

a first transducer (A) for emitting and receiving pulses of ultrasonic energy;

a first ultrasonic pulse generating means (SA) and a first ultrasonic electric pulse receiving means (MA) for said first transducer;

a first electric wave transmission channel from said first pulse generator to said first transducer to supply electric energy at a predetermined ultrasonic frequency to said first transducer for emitting ultrasonic acoustic energy for propagation through the skull when said transmission channel is operative;

a first electric wave receiving channel from said first transducer to said first pulse receiving means for supplying said receiver with electric energy at ultrasonic frequencies corresponding to the acoustic ultrasonic energy impinging upon said first transducer when said first receiving channel is operative;

a corresponding second transducer (B) for cooperation with said first transducer when said two transducers are positioned at the temples on opposite sides of the skull of a patient to be examined;

corresponding second pulse generating means (SB) and second receiving means (MB) for said second transducer;

second transmission and receiving channels interconnecting said second pulse generating means and said second receiving means;

a cyclically operating sequence control means (T) including as a part thereof a primary timing oscillator (VI) for generating primary timing pulses functioning as one apparatus primary operating cycle divided into four equal successive time periods I, II, III, IV;

means controlled by said sequence control means for activating the appropriate channels to operate the first transducer as an acoustic transmitter only at the beginning of periods I and III for a duration small in comparison to an entire period and to operate the second transducer similarly for periods II and IV;

means controlled by said sequence control means for activating appropriate channels to operate the first transducer as an acoustic receiver during period I after said first transducer has ceased transmitting and during period IV after the second transducer has ceased transmitting, and to operate the second transducer as an acoustic receiver during period II after said second transducer has ceased transmitting and during period III after the first transducer has ceased transmitting;

a cathode ray tube (K) having X-(horizontal) deflecting means (X1, X2) and Y-(vertical) deflecting means (Y1, Y2);

means for generating a linear X-sweep voltage (SG) varying between two constant positive and negative values (U) having similar absolute values;

means controlled from said sequence control means (T) for synchronizing the sweep voltage so that at the beginning of each time period I, II, III and IV, the sweep voltage is at maximum absolute value and varies linearly during a period to the oppositely poled absolute value and reaches such value prior to the end of the timing period and remains at such value to the end of the timing period, said primary timing oscillator operating at such a repetition rate that each time period is a bit longer than the transit time for a round trip through the skull for an ultrasonic pulse;

means for applying said sweep voltages to the X-deflecting means, the change in sweep voltage polarity during periods I and III causing the sweep to go in a positive going sense between sweep limits and to reverse sweep in a negative going sense during periods II and IV;

signal channels between the Y deflecting means on the one hand and each of the outputs of said pulse receiving means (MA and MB) on the other hand;

means controlled by said sequence control means (T) for activating the channel from the first pulse receiving means (MA) to said Y-deflecting means to provide signals of one polarity during period I and for activating the other channel from the second pulse receiving means (MB) to said Y-deflecting means to provide signals of opposite polarity during the period II;

said transducers and direction X-sweep being so arranged that for example the left transducer will correspond functionally with the X-sweep beginning from the left and the right transducer will correspond functionally with the X-sweep beginning from the right;

whereby the tube display, insofar as left and right are concerned, is naturally associated with the left and right parts of the skull, the X-sweep time in either direction of sweep locating the skull center on the X-sweep at the midpoint of each sweep;

means (FO) responsive to said sweep voltage for detecting and indicating a first instant during each one of said third and fourth periods (III, IV) coincident with the passage of said sweep voltage of its midway value between said two constant voltage levels (+U, −U);

means (G10, G11) controlled by said sequence control means (T) and responsive to the output signals of said pulse receiving means (MA, MB) for detecting and indicating during each one of said third and fourth period (III, IV) a second instant coincident with the reception at one of said first and second transducer means of a pulse of ultrasonic energy emitted from the opposite one of said first and second transducer means; and means (V5, V6) for determining any time different between said first instant and said second instant during each one of said third and fourth cycles (III, IV) and generating a signal representing said time difference, and means for applying said signal as a correction signal to said sweep voltage generating means (SG) for correcting the rate of change of said sweep voltage in a sense to reducing said time difference.

3. An apparatus as claimed in claim 2 comprising:

brilliance control means (Z) for said cathode ray tube (K); and bright-up pulse generating means (LP) controlled by said sequence control means (T) and responsive to said sweep voltage and to said means (FO) detecting and indicating said first instant for generating during each one of said first and second periods (I, II) a first bright-up pulse of a duration substantially equal to the duration of the sweep and during each one of said third and fourth cycles (III, IV) a second bright-up pulse of short duration coincident with said first instant, and means for applying said first and second bright-up pulses to said brilliance control means.

4. An apparatus as claimed in claim 3, wherein said bright-up pulse generating means (LP) include manually controlled means (MM, T2, T3, DF2, DF3) for generating during each one of said third and fourth periods (III, IV) a third bright-up pulse of short duration at a manually variable time spaced from said first instant, and means for applying said third bright-up pulse to said brilliance control means (Z).